United States Patent [19]

Cornell

[11] Patent Number: 6,089,837
[45] Date of Patent: Jul. 18, 2000

[54] PUMP INLET STABILIZER WITH A CONTROL UNIT FOR CREATING A POSITIVE PRESSURE AND A PARTIAL VACUUM

[75] Inventor: Gary L. Cornell, Moreno Valley, Calif.

[73] Assignee: Blacoh Fluid Control, Inc., Riverside, Calif.

[21] Appl. No.: 09/336,095

[22] Filed: Jun. 18, 1999

[51] Int. Cl.[7] .............................. F04B 11/00; F16L 55/04
[52] U.S. Cl. ................... 417/540; 138/30; 138/26
[58] Field of Search .................. 417/540; 138/30, 138/26

[56] References Cited

U.S. PATENT DOCUMENTS

| | | | |
|---|---|---|---|
| 3,935,882 | 2/1976 | Matthews | 138/30 |
| 4,032,265 | 6/1977 | Miller | 417/540 |
| 4,052,852 | 10/1977 | Hart | 60/478 |
| 4,585,400 | 4/1986 | Miller | 417/540 |
| 4,636,226 | 1/1987 | Canfora | 95/138 |
| 4,696,684 | 9/1987 | Shen | 95/266 |
| 4,886,432 | 12/1989 | Kimberlin | 417/478 |
| 5,050,438 | 9/1991 | Ezell, Jr. | 73/861 |
| 5,465,576 | 11/1995 | Miller | 60/478 |
| 5,505,327 | 4/1996 | Witt | 73/49.2 |
| 5,771,936 | 6/1998 | Sasaki et al. | 138/31 |
| 5,772,414 | 6/1998 | Kaneko | 417/540 |
| 5,772,899 | 6/1998 | Snodgrass et al. | 210/767 |
| 5,798,156 | 8/1998 | Mitlitsky et al. | 428/35.9 |

Primary Examiner—Charles G. Freay
Assistant Examiner—Robert Z. Evora
Attorney, Agent, or Firm—Christie, Parker & Hale, LLP

[57] ABSTRACT

A pump inlet stabilizer for positive displacement reciprocating pumps, which reduces pressure fluctuations at the pump inlet and aids in filling the pump head with fluid during each inlet stroke. The pump inlet stabilizer comprises an accumulator housing with a bladder which creates a gas chamber which is fludically isolated from a fluid chamber within the housing, and a control unit. The control unit consists of a compound pressure gauge to measure positive and negative pressure levels in the gas chamber, a ball valve with an open and closed position for opening or closing an inlet into the gas chamber and a venturi pneumatically coupled to a compressed air source. The control unit is able to use the compressed air source, typically shop air, either to reduce the pressure in the gas chamber or increase the pressure in the gas chamber, depending upon whether the outlet of the venturi is blocked or unblocked. The present invention can condition the pump for either high pressure or high vacuum conditions at the pump inlet. To condition excessive inlet pressure the gas chamber is energized to a predetermined pressure level to cushion the force created by the excessive pressure into the inlet. To condition a high vacuum or suction lift state at the pump inlet, an external pressure source is used to forcibly draw air from the accumulator, thereby creating a vacuum in it. The inlet stabilizer is now under partial vacuum which facilitates fluid flow into the accumulator housing in opposite cooperation with the pump's suction stroke.

26 Claims, 2 Drawing Sheets

PUMP INLET STABILIZER WITH A CONTROL UNIT FOR CREATING A POSITIVE PRESSURE AND A PARTIAL VACUUM

FIELD OF THE INVENTION

This invention relates to a pump inlet stabilizer for a reciprocating pump. More particularly, the invention relates to an improved inlet stabilizer which can minimize fluid flow variations when the inlet pressure to the pump exceeds, or is near the limit of the specifications for the pump under use or when the suction lift exceeds or is near the limit of the pump operating parameters.

BACKGROUND OF THE INVENTION

Positive displacement reciprocating type pumps are well known in the art for a wide variety of applications. Reciprocating pumps are used for low to medium capacities and low to high pressures. They are useful for low- to medium-viscosity fluids, or high-viscosity fluids at materially reduced speeds. Generally, such pumps utilize one or more plungers, pistons, or diaphragms which reciprocate in a liquid chamber or cylinder. Cylinder translation is in cooperation with an inlet valve(s), which opens the cylinder to the inlet pipe during the suction stroke, and an outlet valve(s), which opens to the discharge pipe during the discharge stroke.

Reciprocating pumps may be power-driven through a crank and connecting rod or equivalent mechanism, or direct-acting, driven by steam or compressed air or gas. Reciprocating power pumps deliver essentially constant capacity over their entire pressure range when driven at constant speed. As such, the pumping capacity of reciprocating pumps is very predictable over a wide range of operating conditions.

In a typical packaging arrangement, a plurality of pumps take suction from or are supplied from a common constant head. Variations in the pressure of the supply, which can be caused by a variety of factors, such as long lines, fittings, bends etc. can create poor suction conditions. A result of poor suction conditions is that the pump cylinders do not fill completely, and the pump operates less efficiently. A reciprocating pump further complicates the issue by emitting high-frequency pressure waves created by the inlet valve(s) opening and closing. For example, in high inlet pressure applications, a pump's inlet valve(s) can create "water hammer" by their opening and closing action; increasing pipe and pump damage, and decreasing system efficiency.

In high vacuum suction, lift applications, the inlet valve action actually decreases inlet fluid pressure. At suitable combinations of low pressure and high speed the pump can cavitate. Cavitation has great practical significance. It restricts the speed at which the pump may be operated and, when severe, lowers efficiency, produces noise and vibrations, and causes rapid erosion and premature failure of pump parts.

A stabilizer at the pump's inlet will act as an dampener, reducing pressure fluctuations and aid in filling the pump head with fluid during each inlet stroke. Dampeners comprising a tank and a gas filled bladder within the tank are well known for use as inlet stabilizers. However, dampeners of such construction typically operate on inlet pressure fluctuations in either the suction lift or high pressure mode but not both. Accordingly, there continues to be a need for an inlet stabilizer device for use with positive displacement, reciprocating type pumps which maintains specified flow rates during both high inlet pressure and suction lift operation.

SUMMARY OF THE INVENTION

There is therefore provided in a presently preferred embodiment of the present invention an improved inlet stabilizer for positive displacement reciprocating pumps and an improved method of stabilizing the inflow of liquid into a reciprocating pump.

Known inlet stabilizers merely address pumping inefficiencies caused by high inlet pressure or suction lift but not both within the same unit. To overcome the deficiencies in the art, the preferred embodiment of the present invention incorporates unique pressure control features to stabilize inlet pressure for high inlet pressure and high vacuum conditions, depending on whether the pump is being utilized with a high inlet pressure or a suction lift at the inlet of the pump.

In the preferred embodiment of the present invention, the inlet stabilizer, comprising a housing and control unit, are in fluidic communication with the pump inlet, so as to eliminate pump inlet pressure fluctuations. The housing consists of a cylindrical tank or pressure vessel, with a flexible elastomeric bladder or diaphragm within the housing separating a gas chamber from a fluid chamber. The present invention precisely controls the pump inlet pressure by adjusting the fluid volume drawn into the fluid chamber of the housing in response to changes in the pressure level of the gas chamber and the opening and closing of the pump's inlet valve(s).

In the preferred embodiment of the present invention, the control unit facilitates the creation of either a fixed positive pressure or partial vacuum within the gas chamber of the housing. In an alternate embodiment of the present invention, the pump inlet stabilizer control unit incorporates a pressure control mechanism which regulates the pressure level within the gas chamber of the housing according to variations in the pressure level of the fluid source. The pressure control mechanism is in electrical communication with a solenoid valve. The solenoid valve is in pneumatic contact with the gas chamber of the housing and is operatively coupled to an external compressed air source. When the pressure of the fluid source varies above or below a predetermined pressure range the pressure control mechanism sends a signal to the solenoid to readjust the pressure in the gas chamber of the housing accordingly.

To condition excessive inlet pressure the gas chamber is energized to a predetermined positive pressure level to cushion the force created by the excessive pressure into the inlet.

To condition a high vacuum or suction lift state at the pump inlet, the external pressure source is used to forcibly remove air from the gas chamber of the housing, thereby creating a partial vacuum in it. The inlet stabilizer is now under partial vacuum which facilitates fluid flow into the fluid chamber of the housing in opposite cooperation with the pump's suction stroke. Thus, the pump suction stroke draws fluid from the housing. When the pump is filled and the inlet valve(s) closes, the negative pressure within the gas chamber of the housing draws fluid into the fluid chamber of the vessel.

The foregoing objectives and the features of the preferred embodiments will be understood by those skilled in the art with reference to the following detailed description.

DETAILED DESCRIPTION OF THE INVENTION

Figure 1:
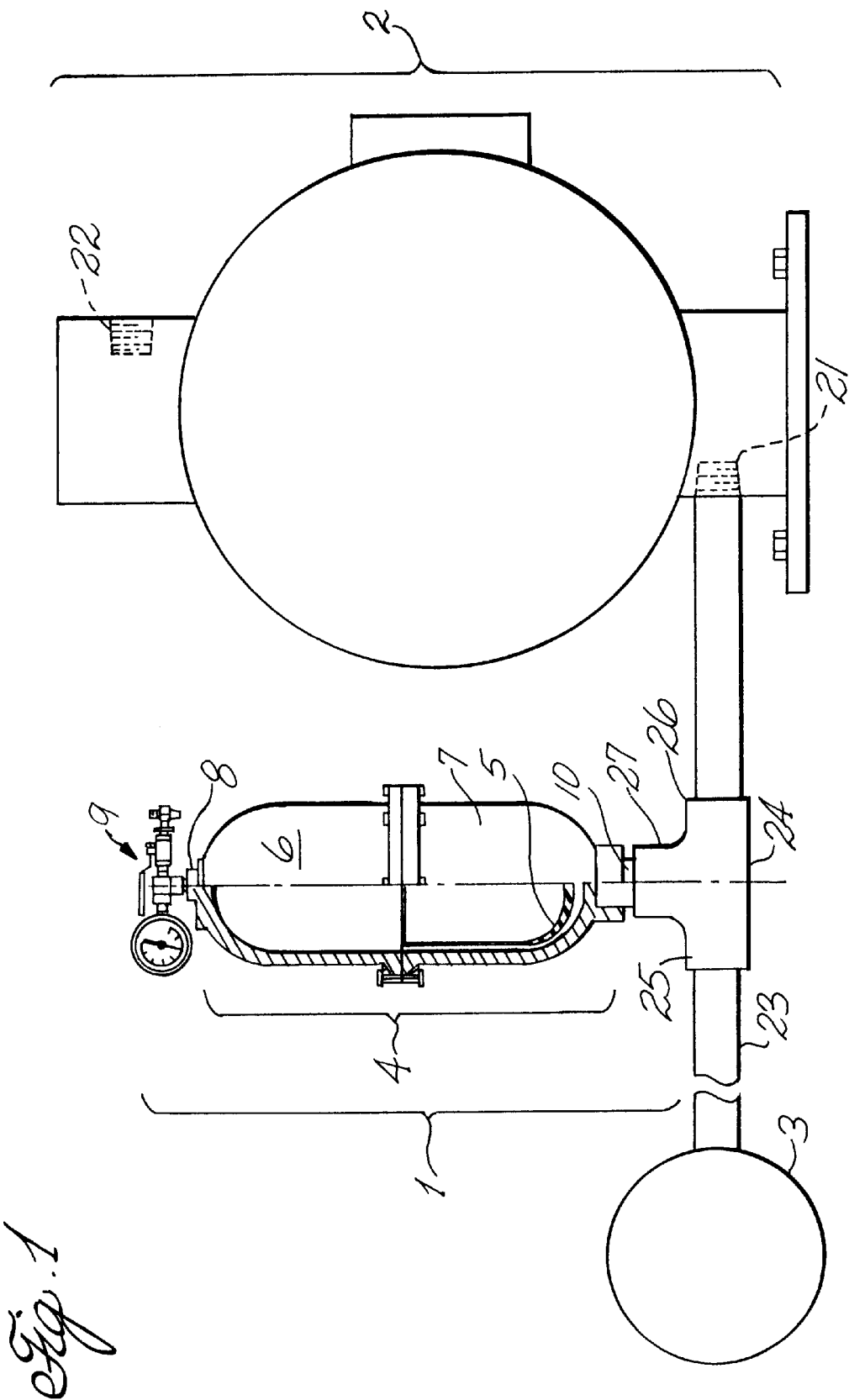
FIG. 1 is a schematic diagram of a pump inlet stabilizer installed in a fluid system having a pump.

Referring to FIG. 1, there is shown a pump inlet stabilizer 1 installed in a fluid system having a pump 2 and a source of fluid 3 which is under pressure. Pump inlet stabilizer 1 has a vessel or housing 4. Housing 4 includes an elastomeric bladder 5 which is in sealing contact with the inner walls of housing 4 to form a gas chamber 6 above bladder 5 and a fluid chamber 7 below bladder 5. As a result, chambers 6 and 7 are fluidically isolated from each other. Housing 4 and bladder 5 can be specifically chosen to accommodate the particular parameters of the fluid being pumped.

In the preferred embodiment of the present invention the total volume of housing 4 is typically two or more times as large as that of the total chamber volume of pump 2. The accumulated fluid within fluid chamber 7 during pump operation is typically 20–50% of the total chamber volume of pump 2.

In gas chamber 6 there is a gas port 8 which is in pneumatic communication with an inlet stabilizer control unit 9 allowing pressurization or depressurization of gas chamber 6. Fluid chamber 7 has an opening 10 allowing fluid to accumulate in fluid chamber 7 or discharge therefrom. The present invention precisely controls the inlet pressure at pump 2 by adjusting the volume of fluid chamber 7 in response to pressure changes in gas chamber 6. Bladder 5 adjusts the volume of fluid chamber 7 by expanding into fluid chamber 7 or contracting into gas chamber 6 in response to an increase or a decrease in the pressure levels within gas chamber 6 and pressure fluctuations in pump 2. Inlet stabilizer control unit 9 regulates the pressure level in gas chamber 6.

Figure 1A:
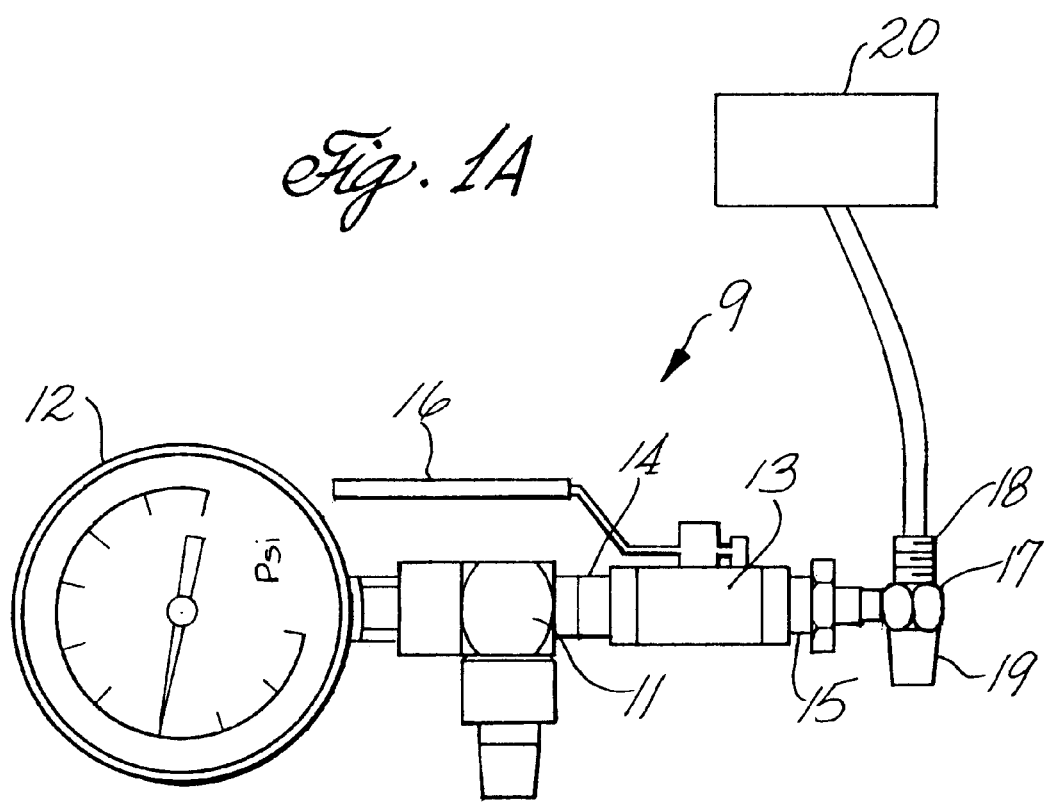
FIG. 1a is a schematic diagram of the inlet stabilizer control unit.

As shown in FIG. 1a inlet stabilizer control unit 9 has a standard pipe tee 11. Pipe tee 11 has one in-line leg that is connected to a pressure gauge 12, another in-line leg that is connected to one port 14 of a ball valve 13, and a perpendicular leg that is connected to gas port 8. A second port 15 of ball valve 13 is connected to the throat of a venturi 17. Ball valve 13 has a handle 16 to open and close ball valve 13. Venturi 17 has a threaded inlet 18, to which a compressed air source 20 is connected, and an outlet 19 that empties into the atmosphere. Venturi 17 is in pneumatic communication with ball valve 13 so air can flow from threaded inlet 18 to ball valve 13 or through venturi 17 to outlet 19.

In the preferred embodiment of the present invention venturi 17 consists essentially of a constriction that is placed in a pipe and causes a drop in pressure as gas flows through it. In the preferred embodiment a short straight pipe section or throat is located between inlet 18 and ball valve port 15. Alternate embodiments of venturi 17 include a simple straight pipe section or a diverging section.

In the preferred embodiment of the present invention, pressure gauge 12 is a compound pressure gauge capable of measuring both positive and negative pressure levels as known to those skilled in the art. Pressure gauge 12 is able to measure the static and dynamic pressure levels within gas chamber 6.

Pump 2 has an inlet 21 and an outlet 22. In the preferred embodiment pump 2, is a Positive Displacement Pump (reciprocating or rotary), the operation of which is known to those skilled in the art, the details of which are not shown. Pump 2 includes a flexible bladder or a reciprocating plunger or piston (not shown) within the pump housing. The region of pump 2 into which the liquid is drawn and from which the fluid is discharged defines the fluid chamber of pump 2 (not shown). The flexible bladder is adapted to vary the volume of the fluid chamber on the suction and discharge strokes of pump 2. Pump 2 includes one-way inlet and discharge valve(s) (not shown) at inlet and discharge ports, 21,22 respectively, which open and close between strokes.

Pressurized fluid source 3 is fluidically coupled to the pumping system via a fluid source line 23. Pump inlet stabilizer 1 is fluidically coupled to fluid source line 23 via a standard pipe tee fitting 24 as is known to those skilled in the art. Pipe tee 24 has one in-line leg 25 that is connected to fluid source line 23, another in-line leg 26 that is coupled to pump inlet port 21, and a perpendicular leg 27 that is connected to pump inlet stabilizer 1. Pipe tee 24 is sized to accommodate the fluid being pumped, accounting for source pressure, fluid viscosity etc. The preferred pipe tee material will vary in accordance with the system specifications of the packaging arrangement in which inlet stabilizer 1 is to be used. In most instances, pipe tee 24 will match the diameter and materials used in fluid source line 23, i.e. PVC to PVC or galvanized to galvanized, etc.

Pump inlet stabilizer 1 functions much like a constant pressure head located immediately adjacent to pump inlet port 21 to improve pump efficiency and reduce premature component failure. During high inlet pressure applications, the inlet valve of pump 2 creates a "water hammer" effect by it's rapid opening and closing action. To condition pump 2 for excessive inlet pressure, pump inlet stabilizer 1 is installed at pump inlet 21. Air tight ball valve 13 is opened creating an inlet into gas chamber 6 of housing 4. Compressed air source 20 is applied to threaded inlet 18 of venturi 17 and venturi outlet 19 is blocked, for example, by the finger of the person that is conditioning pump 2. As a result the pressurized air flows through ball valve 13 into gas chamber 6. When the predetermined pressure is achieved in gas chamber 6, as measured by pressure gauge 12, ball valve 13 is closed, effectively removing compressed air source 20 and trapping the predetermined positive pressure in gas chamber 6 of housing 4.

In the preferred embodiment of the present invention the pressure level in gas chamber 6 of housing 4 is typically about 20–80% of the static pressure of fluid source 3. Thus, when the inlet valve of pump 2 is open, the pressure in the fluid chamber of pump 2 is below the pressure in gas chamber 6 of housing 4. Therefore, fluid is not drawn into pump inlet stabilizer 1 on the suction stroke of pump 2. When the inlet valve closes the pressure in gas chamber 6 of housing 4 is approximately 20–80% of the pressure of fluid source 3. Therefore, when the inlet valve of pump 2 closes during the discharge stroke of pump 2, pump inlet stabilizer 1 cushions the force created by excessive pressure into pump inlet 3 by accumulating fluid into fluid chamber 7 of housing 4.

During the suction stroke of a suction lift pump, the inlet valve of pump 2 is opened and the piston moves so as to increase the volume of the fluid chamber of pump 2. The pressure in the fluid chamber of pump 2 is lower than fluid source 3, so that fluid is drawn into pump 2. However, as the piston reaches the top of the suction stroke, the position at which the piston changes direction, pressure inversions can occur, raising the pressure in the fluid chamber of the pump above that of fluid source 3. This pressure inversion can result in incomplete chamber filling as well as reversal of fluid flow away from pump inlet 21 back to fluid source 3. When the inlet valve(s) of pump 2 closes, vapor-filled cavities can be formed in fluid source line 23 causing cavitation or other undesirable effects.

To condition pump 2 for suction lift operation, pump inlet stabilizer 1 is installed at pump inlet 21. Air tight ball valve 13 is opened creating an outlet from gas chamber 6 of housing 4. Compressed air source 20 is applied to threaded inlet 18 of venturi 17 and outlet 19 is unblocked, for example, by removing the finger of the person that is conditioning the pump. As a result, the pressurized air bypasses ball valve 13 and flows into the atmosphere through outlet 19. This air flow creates a vacuum at ball valve 15 to draw air out of gas chamber 6 creating a sub-atmospheric pressure therein. When the predetermined sub-atmospheric pressure or partial vacuum is achieved in gas chamber 6, as measured by pressure gauge 12, ball valve 13 is closed. Pump inlet stabilizer 1 is now under partial vacuum to facilitate fluid flow into or out of fluid chamber 7 in opposite cooperation with the suction stroke of pump 2.

In the preferred embodiment of the present invention the vacuum level in gas chamber 6 of housing 4 is typically about 20–80% of the vacuum created in fluid source line 23. In the preferred embodiment, a vacuum gauge would be installed in fluid source line 23 to measure the suction lift vacuum and to allow for periodic adjustment of the vacuum level in pump inlet stabilizer 1.

In summary, control unit 9 is able to use compressed air source 20, typically shop air, either to reduce the pressure in gas chamber 6 or increase the pressure in gas chamber 6, depending upon whether outlet 19 is blocked or unblocked. Thus, control unit 9 is able to condition pump 2 for either high inlet pressure or high vacuum conditions, depending on whether pump 2 is being utilized with a high inlet pressure or a suction lift at pump 2.

Although a preferred embodiment of the present invention has been described, it should not be construed to limit the scope of the invention. In an alternate embodiment the present invention can be used as a common stabilizer for multiple pumps in a fluid distribution system. In an alternate embodiment of the present invention, inlet stabilizer control unit 9 incorporates a pressure control mechanism which regulates the pressure level within gas chamber 6 of housing 4 according to variations in the pressure level of fluid source 3. The pressure control mechanism is in electrical communication with a solenoid valve and monitors the pressure within gas chamber 6 of housing 4. The solenoid valve is in pneumatic contact with gas chamber 6 of housing 4 and is operatively coupled to an external compressed air source. When the pressure of fluid source 3 varies above or below a predetermined pressure range the pressure control mechanism sends a signal to the solenoid to readjust the pressure in gas chamber 6 of housing 4 accordingly.

Moreover, those skilled in the art will understand that various modifications may be made to the described embodiment without departing from the true spirit and scope of the novel concepts of the present invention. For example, the present invention can be utilized as a pressure stabilizer for low pressure system where a valve opens and closes rapidly creating a pressure spike. It is to be understood that no limitation with respect to the specific embodiments illustrated is intended or should be inferred. It is the applicants intention to cover by claims all such uses of the invention and those changes and modifications which could be made to the embodiments of the invention herein chosen for the purpose of disclosure without departing from the spirit and scope of the invention.

What is claimed:

1. A fluid handling system comprising:
   a fluid source;
   a positive displacement pump with an inlet and an outlet;
   a pump inlet stabilizer for stabilizing pressure levels at the inlet of said pump during either high pressure or high vacuum conditions, said pump inlet stabilizer further comprising:
      a housing, including a fluid chamber fluidically coupled to said fluid source and said pump inlet, and a gas chamber, wherein the volume of said fluid chamber varies in response to pressure variations in said gas chamber; and
      a control unit, pneumatically coupled to said gas chamber and a compressed air source, the control unit being adapted to create and maintain a predetermined positive pressure or partial vacuum level in said gas chamber.

2. The fluid handling system of claim 1 wherein said housing further comprises an isolation member in sealing contact with the inner walls of the housing to form a gas chamber on a first side of said isolation member and a fluid chamber on a second side of said isolation member, said isolation member being adapted to vary the volume of said fluid chamber in response to pressure variations in said gas chamber.

3. The fluid handling system of claim 2 wherein said isolation member is a flexible bladder.

4. The fluid handling system of claim 1 wherein said control unit further comprises a compound pressure gauge for measuring a positive pressure or partial vacuum level in said gas chamber.

5. The fluid handling system of claim 1 wherein said control unit further comprises a valve, having an open and closed position, for blocking gas flow to and from said gas chamber when a predetermined positive pressure or partial vacuum level in said gas chamber is reached and for maintaining said predetermined positive pressure or partial vacuum level.

6. The fluid handling system of claim 4 wherein said control unit further comprises:
   a tube, comprising an inlet pneumatically coupled to a compressed air source, an outlet that exhausts air into the atmosphere, and a throat in pneumatic communication with said valve, said tube being adapted to create, either a positive pressure in said gas chamber when said outlet is closed and said valve is open, or alternatively, to create a low pressure at said throat and a resulting partial vacuum in said gas chamber when said outlet and valve are open.

7. The control unit of claim 5 wherein said tube is a venturi tube.

8. The fluid handling system of claim 6 wherein said compressed air source is removed from said tube when predetermined positive pressure or partial vacuum level has been reached in the gas chamber of said housing.

9. The fluid handling system of claim 1 wherein the volume of said housing is about at least two or more times as large as that of the total chamber volume of the pump.

10. A fluid handling system comprising:
    a fluid source,
    a positive displacement pump with an inlet and an outlet; and
    a pump inlet stabilizer for stabilizing pressure levels at the inlet of said pump during either high pressure or high vacuum conditions, said pump inlet stabilizer further comprising:
       a housing fluidically coupled to said fluid source and said pump inlet, wherein said housing further comprises:

an isolation member which forms a gas chamber on a first side of said isolation member and a fluid chamber on a second side of said isolation member, said isolation member being adapted to vary the volume of said fluid chamber in response to pressure variations in said gas chamber;

means for measuring a positive pressure or a partial vacuum level in said gas chamber;

means for creating a predetermined positive pressure or partial vacuum level in said gas chamber; and means, comprising a valve having an open and closed position, for maintaining said predetermined positive pressure or partial vacuum in said gas chamber by moving into the closed position and preventing gas flow into or out of said gas chamber when the predetermined pressure positive pressure or partial vacuum level is measured.

11. The fluid handling system of claim 10 wherein the means for creating a predetermined positive pressure in said gas chamber further comprises:

a tube comprising an inlet pneumatically coupled to a compressed air source, an outlet that exhausts air into the atmosphere, and a throat in pneumatic communication with said valve such that compressed air flows from the inlet through the valve to create a positive pressure in the gas chamber when the outlet is closed and the valve is open.

12. The fluid handling system of claim 10 wherein the means for creating a predetermined partial vacuum in said gas chamber further comprises:

a tube comprising an inlet pneumatically coupled to a compressed air source, an outlet that exhausts air into the atmosphere, and a throat in pneumatic communication with said valve such that compressed air flows from the inlet through the throat, drawing gas from said gas chamber through said valve, to be exhausted, along with said compressed air, into the atmosphere through the outlet of said tube, creating a partial vacuum in the gas chamber, when the outlet and valve are open.

13. The fluid handling system of claim 10 wherein the means for measuring a positive pressure or partial vacuum level in said gas chamber is a compound pressure gauge.

14. A method for stabilizing inlet pressure of a positive displacement pump for high pressure and high vacuum conditions at an inlet of said pump, depending on whether the pump is being utilized as a high pressure or a suction lift pump, said method comprising the steps of:

installing a pump inlet stabilizer at the inlet of the pump, said pump inlet stabilizer further comprising:

a housing with an isolation member which forms a gas chamber on a first side of said isolation member and a fluid chamber on a second side of said isolation member, said isolation member being adapted to vary the volume of said fluid chamber in response to pressure variations in said gas chamber;

opening a valve creating an opening into said gas chamber of said housing;

creating a positive pressure in said gas chamber of said housing when the pump is being utilized with a high pressure at the inlet of the pump;

creating a partial vacuum in said gas chamber of said housing when the pump is being utilized with a suction lift at the inlet of the pump; and measuring when a predetermined positive pressure or partial vacuum level is reached within said gas chamber of said accumulator housing and sealing the positive pressure or partial vacuum in said gas chamber of said housing by closing said valve.

15. The method of claim 14 wherein the creating a positive pressure in said gas chamber of said housing when the pump is being utilized with a high pressure at the pump inlet step further comprises:

creating a positive pressure of about 20–80% of the static pressure of said fluid source in said gas chamber when the pump is being utilized with a high pressure at the pump inlet.

16. The method of claim 14 wherein the creating a partial vacuum in said gas chamber of said housing when the pump is being utilized with a suction lift at the pump inlet step further comprises:

creating a sub-atmospheric pressure of about 20–80% of the partial vacuum created in a fluid source line of said fluid source.

17. The method of claim 14 wherein the creating a positive pressure in said gas chamber of said housing when the pump is being utilized with a high pressure at the pump inlet step further comprises:

applying a compressed air source to an inlet of a tube whose throat is pneumatically coupled to said valve such that compressed air flows from said inlet through said valve creating a positive pressure in said gas chamber when a outlet of said tube is closed and said valve is open.

18. The method of claim 14 wherein the creating a partial vacuum in said gas chamber of said housing when the pump is being utilized with a suction lift at the pump inlet step further comprises:

applying a compressed air source to an inlet of a tube whose throat is pneumatically coupled to said valve such that compressed air flows from said inlet through said throat, drawing air from said gas chamber, through said valve, which is exhausted along with said compressed air, to the atmosphere through an outlet of said tube, creating a partial vacuum in the gas chamber, when the outlet and valve are open.

19. A pump inlet stabilizer for use with a fluid source and a positive displacement pump with an inlet and an outlet, the pump inlet stabilizer comprising:

a housing, including a fluid chamber, fluidically coupled to said fluid source and said pump inlet, and a gas chamber, wherein the volume of said fluid chamber varies in response to pressure variations in said gas chamber; and a control unit, pneumatically coupled to a compressed air source, wherein the control unit adapts said pump inlet stabilizer to stabilize high inlet pressure or high vacuum conditions at the inlet of the pump by creating and maintaining a predetermined positive pressure or partial vacuum level in said gas chamber.

20. The pump inlet stabilizer of claim 19 wherein said housing further comprises:

an isolation member in sealing contact with the inner walls of the housing to form a gas chamber on a first side of said isolation member and a fluid chamber on a second side of said isolation member, said isolation member being adapted to vary the volume of said fluid chamber in response to pressure variations in said gas chamber.

21. The pump inlet stabilizer of claim 20 wherein the isolation member further comprises a flexible bladder.

22. The pump inlet stabilizer of claim 19 wherein said control unit further comprises a compound pressure gauge for measuring a positive pressure or partial vacuum level in said gas chamber.

23. The pump inlet stabilizer of claim 19 wherein said control unit further comprises a valve, having an open and closed position, for blocking gas flow to and from said gas chamber when a predetermined pressure or partial vacuum level in said gas chamber is reached and for maintaining said predetermined pressure or partial vacuum level.

24. The pump inlet stabilizer of claim 23 wherein said control unit further comprises:

a tube comprising an inlet pneumatically coupled to a compressed air source, an outlet that exhausts air into the atmosphere, and a throat in pneumatic communication with said valve, said tube being adapted to create, either a positive pressure in said gas chamber when said outlet is closed and said valve is open, or alternatively, to create a low pressure at said throat and a resulting partial vacuum in said gas chamber when said outlet and valve are open.

25. The control unit of claim 24 wherein said tube is a venturi tube.

26. The pump inlet stabilizer of claim 19 wherein the volume of said housing is about at least two or more times as large as that of the total chamber volume of the pump.

* * * * *